United States Patent Office 3,700,474
Patented Oct. 24, 1972

3,700,474
INCREASE IN CLAY RESPONSIVENESS TO WETTING
William J. Lang, Libertyville, Ill., assignor to International Minerals & Chemical Corporation
No Drawing. Filed Dec. 9, 1970, Ser. No. 96,601
Int. Cl. C09c 1/42
U.S. Cl. 106—288 B                    14 Claims

ABSTRACT OF THE DISCLOSURE

A method for treating a platey-type clay, namely, a clay such as bentonite having a micaceous sheet structure, to make it more readily slakable in water, which comprises compacting fine particles of the clay, having a maximum moisture content of about 20% by weight of water, into sheet form, and crushing the clay sheet thus formed.

BACKGROUND OF THE INVENTION

This invention relates to the treatment of clays and, more particularly, to a method for treating a platey-type clay to increase its responsiveness to wetting.

Clays having a micaceous structure possess the properties of self-suspension, swelling and gelatinizing when mixed with water. These clays are advantageously used in many industries because of their unique properties. As illustrative of the different uses which such clays have, they find application in well drilling muds of widely varying composition. Drilling fluids are circulated in wells being drilled by the rotary process to provide lubrication during the drilling operation, carry the cuttings out of the well hole, provide a substantially impervious lining along the walls of the bore hole so as to prevent the loss of the drilling fluid into the formation, and a number of other purposes. These platey clays are also used in numerous other industries, as for example, in foundry molding compositions, as suspension aids in agricultural sprays, and for thickening cosmetics.

Unprocessed mined clay is typically in the form of large lumps containing excessive moisture. It is usually dried and reduced in size before it is sold in order that it may be more conveniently transported and used. When the clays are used in water for their suspension and gel-forming properties, they are mixed with water with suitable agitating apparatus. However, clays which have been merely dried and ground are sometimes difficult to disperse in water so that they are limited in their usefulness.

Clays that are difficult to slake or disperse in water sink to the bottom of the vessel and resist soaking to a surprising degree when added in lump form. When a mass of clay is added to the water in finely-divided form, the form in which clay is generally utilized, the particles in contact with the water swell to seal off the interior of the mass and form an agglomerate having a dry interior. These agglomerates may be dispersed only with considerable difficulty since they adhere to the mixing equipment and, consequently, require considerable time and power consumption before the clay is evenly dispersed in the water.

Numerous methods have been proposed for altering properties of the various types of platey clays in order that they may be more easily dispersed in water. For example, U.S. Pat. No. 2,036,617 of Bechtner et al. is directed to a process whereby difficultly slakable clay is made more responsive to wetting by limiting the particle size of the clay so the particles in dry form are substantially of a preferred size range. The theory behind this method is to substantially eliminate the large particles into which the water penetrates very slowly and the fine particles which tend to float or form into agglomerates that resist wetting. The maximum size of the particles used is determined by the rate of swelling of the clay so that the water can penetrate to the core of the clay particles before the surface swells to form a gelatinous sealing layer.

A process which has been suggested for altering the properties of rod-like or chain structure type of clays may be found in U.S. Pat. No. 2,231,328 of Simons. In accordance with this process, fuller's earth is extruded under a pressure of from about 100 to about 500 p.s.i. while it is in the moist form, i.e., at a moisture content of about 52% water. The extruded clay is then dried at a temperature substantially below 600° F., preferably about 200° F. It is alleged that extrusion under the specified pressure ruptures the original structure of the clay and causes each particle to move or slip to a new position relative to the other particles. The patentee teaches that this change in structure alters the original properties of the clay so that it will readily slake when mixed with water.

The various processes which have been suggested for treating clays in order that they may be more readily dispersed in water are not entirely satisfactory. For example, while the process of the aforementioned Bechtner et al. patent is effective for making difficultly slakable clays more easily incorporated in water, it would be beneficial to improve the clays even a greater degree than obtained by that process.

SUMMARY OF THE INVENTION

This invention is based on the discovery of a process for treating clays having a micaceous sheet structure, such as bentonite, in order that they may be more readily slaked or dispersed in water. The clays which have been treated in accordance with this invention are more responsive to wetting, i.e., are dispersed in water in less time and with less energy than heretofore possible. Briefly, the process of this invention for treating clays comprises initially compacting a finely-divided, platey-type clay, e.g., bentonite, having a moisture content of from about 0 to about 20% free water into sheet form, such as by subjecting it to a pressure of from about 10,000 to about 200,000 p.s.i. between cylindrical rolls, to obtain a mass having an apparent density of from about 60 to about 94% of the apparent density of the clay before it is ground. The clay sheet thus formed is then crushed to any desired granular size.

It will be apparent to one skilled in the art that the process of this invention is substantially different from that of the Simons patent. The Simons patent is described as being effective for changing the structure of a rod-type clay such as attapulgite to make it more readily slakable in water, whereas treatment by the instant invention has the same result on a platey-type clay without making any physical changes in the clay. The type and magnitude of pressure exerted on the clay are also different. The clay treated by Simons' process must be in the moist form while it is subjected to a relatively low extrusion pressure, but the clay may have a maximum moisture content of about 20% water when subjected to extremely high compaction pressure, i.e., as high as 200,000 p.s.i. when treated by the invention of this application. In addition, the higher moisture content of the clay extruded in Simons' process requires that it also be dried after extrusion.

It is, therefore, a primary object of this invention to provide a process for enhancing the responsiveness to wetting of clays having a micaceous sheet structure.

Another object of this invention is to provide a method for compacting platey-type clays under high pressure in order that they may be more readily slaked or dispersed in water.

Still another object of this invention is to provide a method for treating clays in order that they may be readily dispersed in water with minimum mechanical energy.

A further object of this invention is to provide clays that are more responsive to wetting than clays that have been heretofore available.

These and further objects of this invention will become apparent or be described as the description thereof herein proceeds.

DESCRIPTION OF THE PREFERRED EMBODIMENTS

The process of this invention is applicable generally to clays having a micaceous sheet structure. Such clays, include two-layer minerals wherein the sheet structures are composed of units of one layer of silica tetrahedrons and one layer of alumina octahedrons, such as kaolinite and haloysite. The process is equally applicable to three layer clays comprised of one central dioctahedral or trioctahedral layer between two layers of silica tetrahedrons of both the expanding lattice and nonexpanding lattice types. Illustrative of the latter clays which may be enhanced in accordance with this invention are montmorillinite, vermiculite, hectorite, and illite. The process of this invention will have considerable utility for increasing the responsiveness to wetting of bentonitic clays.

The process of the instant invention is also useful for treating such clays in compositions containing a major portion of the clay in combination with other components. The clay will usually be present in an amount of at least 50% by weight of the compositions, but compositions containing even a smaller amount of clay, e.g., at least about 35% by weight of clay, are also contemplated. Illustrative of such compositions are premixed foundry sand binder additives, as for example, mixtures containing from about 50 to about 95% by weight of the clay, e.g., a bentonitic type of clay, and from about 5 to about 50% by weight of a finely-divided combustible component, such as sea coal, cereal, cob flour, wood flour, or a mixture of any two or more of such combustible materials.

In carrying out the process of this invention, it is usually necessary to initially process the mined clay to obtain compactor feed material of the proper moisture content and size since the clay is typically mined in the form of large lumps containing excessive moisture. This is most conveniently done by adjusting the conditions of the drying and granulation procedures which the mined clay normally undergoes.

It has been found that the moisture content of the clay feed for the compaction operation influences the rate at which the final clay product of this invention is dispersed in water. A finished granular clay product of optimum dispersing characteristics is obtained when the water content of the clay feed is at a maximum of about 20% by weight of free water, with a moisture content of from about 6% to about 15% being preferred.

The clay is ground by suitable means to obtain a finely-divided material, i.e., material of a size of about minus 100 mesh (Tyler), before it is fed to the compactor. Clay of the size of at least about 70% minus 200 mesh or even finger, e.g., at least about 70% minus 325 mesh, in most appropriate for treatment in accordance with this invention.

The temperature of the clay fed to the compacting operation is not critical and may generally range from a low temperature of from about 32° F. to a high temperature of about 300° F. However, higher and lower temperatures may also be utilized.

In the compaction operation, the clay is compacted under suitable pressure into a sheet or ribbon having an apparent density which is in the range of from about 60 to about 94%, preferably from about 67 to about 82%, of the apparent density of the clay before it is ground and of substantially the same moisture content. For example, a compacted bentonite mass which is obtained from the compaction operation will typically have an apparent density within the range of from about 90 to 110 pounds per cubic foot. This is in comparison to the apparent density of a typical natural dried bentonite of about 134 pounds per cubic foot, although the actual apparent density of mined bentonite will vary with moisture content and from deposit to deposit. The pressure utilized in the compaction is not critical, but will generally range from about 10,000 p.s.i. to about 200,000 p.s.i., most frequently from about 20,000 p.s.i. to about 50,000 p.s.i. The pressure exerted on the clay during the compaction operation is in part dependent upon the moisture content of the clay so that clays of low moisture content will require greater compacting force than clay of higher moisture content.

Machines for carrying out the compaction of the clay are commercially available. However, such compaction machinery has not been heretobefore employed or even suggested for treating clay or contemplated by this invention, and do not of themselves form a part of the instant invention. Exemplary of suitable equipment for achieving the necessary compaction of the clay is a roll compactor including cylindrical rolls which are urged together under desired pressure, such as the B series of compactor that is manufactured by K. R. Komarek, Inc.

The clay sheet or ribbon which is obtained from the compactor is then crushed to any desired size, as for example, to any of the so-called standard "granular" sizes. The clay will most frequently be crushed to a size between 12 mesh and 100 mesh, although it may also be crushed to particles which are finer or even larger in size. Any of the equipment known in the art as being suitable for crushing clay may be used for this operation. Suitable crushing equipment includes standard roll crushers, granulating mills with corrugated rolls, cage mills and the like. The crushed clay is then usually sized by means of screens to produce granular products of various size ranges.

It generally is not necessary to dry the clay after it has been compacted, crushed and sized. The clay is relatively dry when it is fed to the compactor, i.e., at a maximum water content of about 20%. The clay may even lose a portion of this low water content since it becomes warm from friction during processing. However, in those cases where a substantially dry granular product is desired, the moisture content of the clay may be reduced after granulation by drying the clay at a temperature of from about 100° F. to about 300° F.

Clay which has been compacted and then crushed in accordance with this invention slakes when brought into contact with water considerably faster than either the ordinary granular or powdered products of the prior art, and is more responsive in many applications. Bentonite thus treated swells wtihout agitation to more than 90% moisture by weight in about five minutes when dropped in water. Equivalent wetting of ordinary granular and powdered grades of the same bentonite normally takes many hours, or even days, to swell to the same extent.

The fast responsiveness to wetting and slaking processes of clay treated in accordance with this invention is of primary importance in many industrial applications of the product. Heretofore, considerable mixing energy and time was required in slurry preparation to breakdown and wet the clay particles to achieve a homogeneous and stable slurry. In applications where wetted bentonite products are used as binders, such as in foundry molding sand compositions, considerable mixing and mulling energy was required to wet and distribute clay cuttings on the sand grains. The accelerated responsiveness of clay to wetting and slaking that is obtained by the treatment of this invention, therefore, facilitates, shortens the time and improves the effectiveness of many industrial uses of clays such as bentonite.

The following non-limiting examples will serve to illustrate the effectiveness of the process of this invention for improving the responsiveness of clay to wetting.

EXAMPLE I

This experiment was conducted to demonstrate the improvement in the responsiveness of the clay such as for foundry purposes which is obtained by the process of this invention. A series of sand-clay mixtures containing about 3.12% moisture was prepared by mulling 94 parts by weight of A.F.S. 50-25 Wedron sand and 6 parts by weight of a bentonite which was prepared in accordance with this invention. The bentonite was a finely-divided Western bentonite compacted with a Model B-100 compactor sold by K. R. Komarek, Inc. under 6 tons roll separation force with 2-inch width rolls, and the clay ribbon thus formed was then crushed and screened to obtain a 20 by 70 mesh product. The various sand-clay mixtures were mulled for different lengths of time, differing by half-minute intervals, and the green compression strength of each of the mixtures was measured to determine the responsiveness of the clay in the mixtures to mulling. The green compression strength of the mixtures, which is defined as the pressure in pounds per square inch required to cause collapse of a standard rammed cylinder of undried sand composition, was determined in accordance with the standards of the American Foundrymen's Society utilizing a Model 405 Dietert Strength Tester.

For the purpose of comparison, the above procedure was then repeated utilizing, in lieu of the clay treated as hereinbefore described, one of the most responsive of commercially available bentonite products. The sand-clay mixtures prepared utilizing the commercially available product contained 2.92% by weight moisture.

The results of the tests are given below in Table I:

TABLE I

| Mulling time, minutes | Green compression strength, p.s.i. | |
|---|---|---|
| | Compacted and and crushed bentonite | Commercially available bentonite |
| 0.5 | 4.7 | 2.9 |
| 1 | 7.2 | 4.8 |
| 1.5 | 8.3 | 6.4 |
| 2 | 9.1 | 7.8 |
| 2.5 | 9.6 | 8.8 |
| 3 | 10.0 | 10.0 |
| 3.5 | 10.5 | 10.9 |

The improvement in the responsiveness of the clay obtained by the process of this invention will readily be noted by reference to the foregoing data. For example, after a mulling time of one and one-half minutes, which is the typical mulling time in foundry operations, the mixtures containing the clay treated in accordance with this invention had a green compression strength of 8.3 p.s.i. while the other mixture mulled for the same length of time had a green compression strength of only 6.4 p.s.i.

EXAMPLE II

In another series of experiments, the improvement obtained by this invention in the responsiveness of the clay for preparing stable and homogeneous slurries, such as for preparing well drilling muds, was determined. Different quantities of clay-water slurries having a solids content of 6% by weight were prepared by adding a minus 20 plus 60 mesh Western bentonite which was compacted and sized as outlined in Experiment 1. The difference in the preparation of the quantities of the slurry was that they were mixed for different lengths of time ranging from 2 to 10 minutes by standard American Petroleum Institute methods except for mixing time. Immediately after mixing, the viscosities of the slurries were determined with a Fann viscosimeter at 300 r.p.m. and 600 r.p.m. and recorded. A quantity of the slurry was also mixed for the A.P.I. specified 20 minutes and was then covered and allowed to stand for a period of about 16 hours. At the end of this static aging period, the aged slurry was mixed for an additional five minutes and its viscosity was again determined. The results of these tests are outlined below in Table II:

TABLE II

| Mixing time, minutes | Initial viscosity | | Aged viscosity | |
|---|---|---|---|---|
| | 600 r.p.m. | 300 r.p.m. | 600 r.p.m. | 300 r.p.m. |
| 2 | 21.0 | 14.0 | | |
| 4 | 32.5 | 22.0 | | |
| 6 | 35.0 | 24.0 | | |
| 8 | 35.5 | 24.5 | | |
| 10 | 35.5 | 24.5 | | |
| 20 | | | 36.0 | 24.0 |

The above procedure was then repeated, except that a minus 20 plus 60 mesh Western bentonite that was not compacted and reground in accordance with this invention was used. The results of these experiments are given below in Table III:

TABLE III

| Mixing time, minutes | Initial viscosity | | Aged viscosity | |
|---|---|---|---|---|
| | 600 r.p.m. | 300 r.p.m. | 600 r.p.m. | 300 r.p.m. |
| 2 | 25.0 | 18.0 | | |
| 4 | 35.5 | 25.0 | | |
| 6 | 38.0 | 27.0 | | |
| 8 | 41.0 | 31.0 | | |
| 10 | 42.0 | 31.0 | | |
| 20 | | | 49.0 | 37.0 |

The improvement in the responsiveness of the clay which is obtained by the process of this invention will be noted from comparing the data from Tables II and III. More specifically, the slurry prepared using clay treated in accordance with this invention had a viscosity of 97.22% of the aged viscosity after only six minutes of mixing. In contradistinction, the slurries prepared by utilizing the untreated clay had a viscosity which was only 77.5% of the aged viscosity after six minutes and only 85.4% of the aged viscosity after ten minutes of mixing. The substantial improvement in the responsiveness of the clay which is obtained by this invention will thus be apparent to one skilled in the art.

Although this invention has been described in relation to specific embodiments it will be apparent that obvious modifications may be made by one skilled in the art without departing from the intended scope of this invention as defined by the appended claims.

I claim:

1. A method of increasing the responsiveness of clay to wetting which comprises compacting a ground, finely-divided, platey clay having a maximum moisture content of about 20% by weight under a pressure into a compacted mass having an apparent density of from about 60 to 94% of the apparent density of the clay before it is ground, and crushing the compacted clay to the desired size.

2. A method in accordance with claim 1 wherein said finely-divided clay is at a size of minus 100 mesh.

3. A method in accordance with claim 2 wherein said finely-divided clay is at a size of at least about 70% minus 200 mesh.

4. A method in accordance with claim 3 wherein clay at a moisture content of from about 6 to about 15% by weight of water is compacted.

5. A method in accordance with claim 4 wherein said clay is a bentonitic clay.

6. A method in accordance with claim 4 wherein said finely-divided clay is at a size of at least about 70% minus 325 mesh.

7. A method in accordance with claim 6 wherein said clay at a temperature of from about 32° to about 300° F. is compacted.

8. A method in accordance with claim 7 wherein said finely-divided clay is compacted into a sheet having an apparent density of from about 67 to 82% of the apparent density of the clay before it is ground.

9. A method in accordance with claim 8 wherein said clay is a bentonitic clay.

10. A method in accordance with claim 8 wherein a mixture containing said finely-divided clay is compacted, said mixture comprising from about 50 to about 95% by weight of said clay, and from about 5 to about 50% by weight of a combustible component of the group consisting of sea coal, cereal, cob flour, wood flour and mixtures thereof.

11. As a composition of matter, a clay which was treated in accordance with claim 1.

12. A composition of matter in accordance with claim 11 wherein said finely-divided clay at a size of minus 100 mesh and a moisture content of from about 6 to about 15% by weight was compacted.

13. A composition of matter in accordance with claim 12 wherein said clay is a bentonitic clay.

14. A composition of matter in accordance with claim 12 wherein said finely-divided clay at a size of at least about 70% minus 200 mesh and a temperature of from about 32° to about 300° F. was compacted into a sheet having an apparent density of from about 67 to 82% of the apparent density of the clay before it is ground.

References Cited

UNITED STATES PATENTS

| | | | |
|---|---|---|---|
| 1,561,002 | 11/1925 | Lapp | 106—72 |
| 1,792,058 | 2/1931 | Atkinson | 106—72 |

JAMES E. POER, Primary Examiner

H. M. S. SNEED, Assistant Examiner

U.S. Cl. X.R.

106—309